Figure 1:
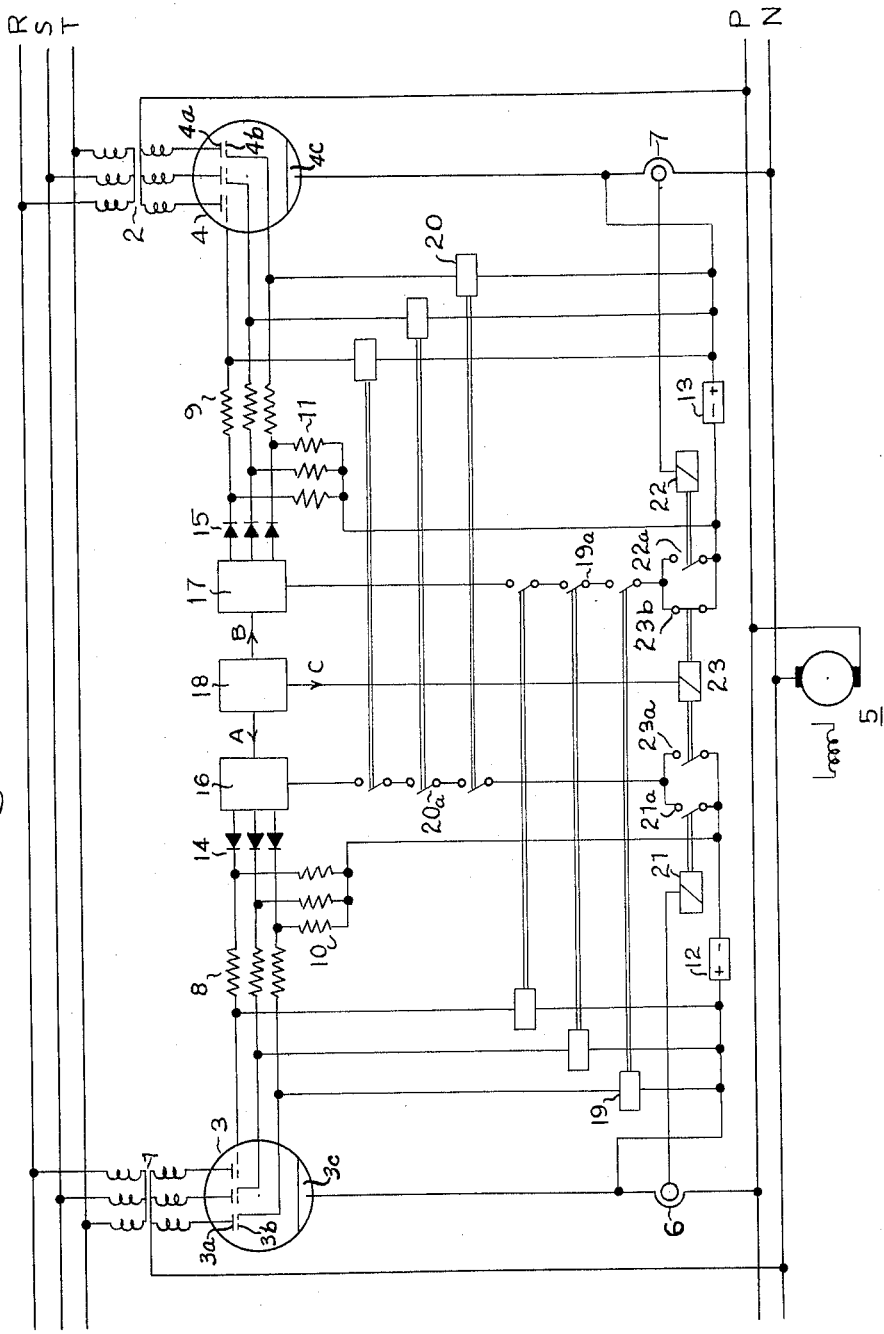

March 15, 1966 M. DEPENBROCK 3,241,037
CONTROL DEVICE FOR CURRENT CONVERTERS IN REVERSE CONNECTION
Filed Aug. 11. 1961 2 Sheets-Sheet 2

INVENTOR.
Manfred Depenbrock
BY
Pierce, Scheffler & Parker
attorneys

United States Patent Office 3,241,037
Patented Mar. 15, 1966

3,241,037
CONTROL DEVICE FOR CURRENT CONVERTERS
IN REVERSE CONNECTION
Manfred Depenbrock, Mannheim-Almendorf, Germany, assignor, by mesne assignments, to Aktiengesellschaft Brown, Boveri & Cie, Baden, Switzerland, a joint-stock company of Switzerland
Filed Aug. 11, 1961, Ser. No. 130,899
Claims priority, application Germany, Aug. 13, 1960, B 58,965
5 Claims. (Cl. 321—37)

This invention relates to electrical current converters and in particular to converters of the type operating in reverse connections.

For the operation of current utilization devices with alternative current direction by means of gas discharge converters there are used, as known, so-called reversible connections where a separate group of gas discharge gaps is associated with each current direction in the load circuit. In these reversible connections one distinguishes the so-called cross-connection, whose characteristic feature is usually the application of multi-anode converter vessels, and the differential parallel connection, which is used with single anode-converter vessels.

Both arrangements can be operated in this way that when a load current flows in a certain direction, only the group of gas discharge gaps considered for this current direction is used for the power supply. If the direction of the current changes in the load circuit, the respective group of gas discharge gaps for the new current direction must be used for the power supply.

In plants particularly for electromotor drives or with transverters, where the time of a desired current reversal can not be foreseen and does not depend on the control of the gas discharge gaps, it is customary, as known, to keep both groups of gas discharge gaps ignition-ready in this way that the group of gas discharge gaps considered for the power supply in the desired direction is controlled as a rectifier and the other group of gas-discharge gaps to be kept blocked is controlled as an inverted converter selecting the maximum admissible inverted converter modulation in view of the so-called respect distance.

In this manner of controlling the gas discharge gaps there are, as known, equalizing currents which extend in impulses and which are called circulating currents; they must be limited by so-called circulating current chokes. These circulating current chokes are expensive, since they are usually made of a high grade magnetic material, and cause additional idle power and additional losses in the converter plant.

It is therefore desirable to modify the control method of the gas discharge gaps in this way that the formation of a circulating current is prevented, so that the circulating current chokes can be eliminated and the formation of additional idle power or losses avoided. A condition that must be met is that a reversal of current in the load circuit must take place only in the current-less state. The observation of this condition is necessary to prevent the formation of circulating currents, which would attain a dangerous value in the absence of circulating current chokes. But meeting this condition alone is not sufficient.

This is due to the fact that in a controlled gas discharge gap whose discharge current extinguishes at a certain moment, the control grid, which has, for example, a negative bias, attains its blocking capacity not at the same moment, but delayed by the so-called release time. This is due to the fact, as known, that the control grid is still surrounded by a part of the positive charge carriers in the discharge space, after the current is extinguished, which become ineffective only after a certain time, that is, after they have been deionized. This deionization is only completed after the return current connected with it has died out in the biasing resistors, and only after this time does the control grid have the voltage value of the negative grid bias. The completion of the release time can thus be recognized by the fact that the control grids applied over resistances to a bias source, actually assume a sufficient negative voltage.

This fact is utilized with advantage by the invention which ensures operation of the converter without circulating current with a minimum of switching time from one current direction to the other.

The invention relates to a control device for converter plants in reversible connection, consisting of two groups of gas discharge gaps destined for the two current directions in the load circuit with respective voltage sources for a negative grid bias and two grid control devices by which, with constant current direction in the load circuit, one group of gas discharge gaps is caused by the respective grid voltage impulses to supply power, while the other group remains blocked by the elimination of the associated grid voltage impulses. For such a control device the invention provides a voltage supervising device for the control grids of the gas discharge gaps, by which, in connection with switching means for the grid control device, when the direction of the load current begins to change after this current has been reduced to the value zero, the connection of the grid voltage impulses for the group of the discharge gaps for the new direction is made dependent on the return of the negative grid voltages on the group of gas discharge gaps for the preceding direction of the load current.

Figure 2:
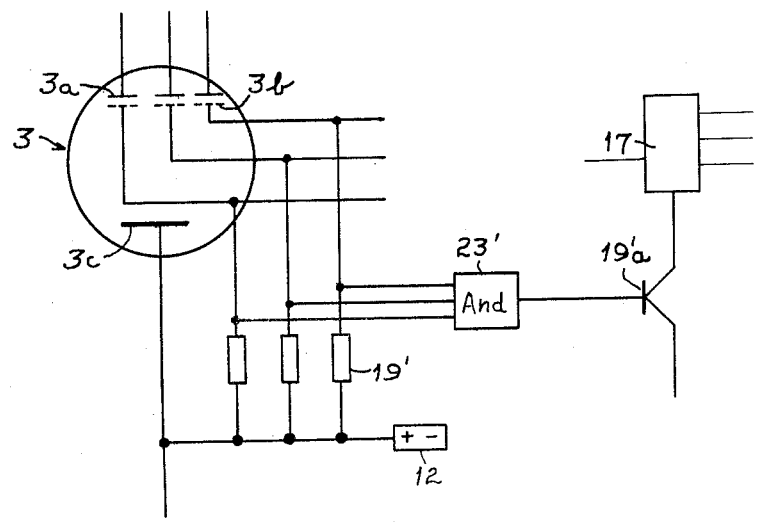

The invention will become more clearly understood from the following detailed description and the accompanying drawings wherein:

FIG. 1 is a schematic circuit diagram illustrating one embodiment of the invention; and FIG. 2 is a partial circuit diagram showing a modification for a part of the circuit illustrated in FIG. 1.

With reference now to FIG. 1 of the drawings, 1 and 2 denote two transformers connected to a three phase mains R, S, T and 3 and 4 two three-anode converter vessels which are connected in cross connection with the load mains P, N. In the example, this load mains is assumed as D.-C. mains to which is connected as a consuming device a D.-C. motor 5. The anode, grid and cathode elements of converter 3 are designated by 3a, 3b and 3c respectively. Similarly, the anode, grid and cathode elements of converter 4 are designated by 4a, 4b and 4c respectively.

But the same cross connection is also suitable for a transverter, for example, for transforming three phase current of 50 c.p.s. to single phase alternating current of 16⅔ c.p.s., the load mains PN supplying the single phase alternating voltage of 16⅔ c.p.s.

Of the two converter vessels 3 and 4, only one carries current at one time. The currents issuing from one or the other cathode of the converter vessels are conducted over the primary windings of the current transformers 6 and 7.

The control grids of the converter vessels are connected over series resistances 8, 9 and shunt resistances 10, 11 wtih the grid bias sources 12, 13. The grid voltages supplied by them are so proportioned that under their action alone the converter vessels are completely blocked. The voltages are, for example, −100 v.

At the connection points of the resistances 8, 10 and of the resistances 9, 11 can be supplied grid voltage impulses over diodes 14, 15, which are generated in the grid impulse generator 16, 17. These grid voltage impulses over-ride the grid bias voltages and render the correlated converter conductive at the proper time as determined in accordance with the invention. The diodes are provided to prevent return flow into the grid impulse generators. The two grid impulse generators are connected with the outputs A, B of a control device 18 which is destined for the respective phase position of the grid voltage impulses required for the desired current intensity. By transmitting an auxiliary voltage or no voltage at the third output C, the control device determines which converter vessel is to receive grid voltage impulses corresponding to the desired current direction in the load circuit. To this end the control device 18 transmits at the output C, for example, an auxiliary voltage if the converter vessel 3 is to be charged, and no auxiliary voltage if the converter vessel 4 is to be charged.

Since the converter plant, which is to work without circulating current, has no circulating current chokes, the current consumption by the converter vessel for the new current direction, in case the direction of the current changes in the load circuit, can only take place when the current has dropped in the other converter vessel to the value zero, and the deionization of the discharge gaps of this converter vessel is completed. Only after this time, which is called release time, have the control grids attained the potential of the negative grid bias and thus their full blocking power. As long as this release time has not elapsed, the converter vessel can still ignite when the other converter vessel for the new current direction ignites, so that a short-circuit would be the result, due to the absence of the circulating current chokes.

The invention provides therefore that the ignition of the converter vessel of the new current direction should be made dependent on the return of the negative grid bias on the control grids of the converter vessel of the preceding current direction. Instead of the control grids can also be used in the discharge space other negatively biased grids or electrodes acting as probes.

The grid voltages are measured by means of the grid supervising devices 19 and 20, represented as relays, with the operating contacts 19a and 20a actuated by them. Each of these operating contacts separates the connection of the grid impulse generator of the opposite side of the cross connection with the cathode of the respective converter vessel.

In addition, the connection of the grid impulse generators with the cathode of the respective converter vessel is also made dependent on two relays 21 and 22 which supervise, in connection with the current transformers 6 and 7, the cathode currents of the converter vessels, and on another relay 23 which is actuated by the control device 18 and thus selects the converter vessel for the desired current direction. The relays actuate the contacts 21a, 22a, as well as 23a and 23b.

Assume now that the converter vessel 3 carries current and a change in the current direction is to be effected, so that the converter vessel 4 will carry current. In the initial state, that is, at the time when the converter vessel 3 is carrying current the relay 21 is in pull-up position and the contact 21a is therefore closed, while the relay 22 is released. The relay 23 is in a pull-up position so that the contact 23a is closed and the contact 23b open. The relays 20 are all pulled up, so that the contact chain 20a is closed while of the contacts 19a at least one is open.

Under these conditions the connection between the grid impulse generator 16 and the control grids of the converter vessel 3 is established, while the grid impulse generator 17 is separated from the converter vessel 4.

If the current direction is to change in the load circuit, the current of the converter vessel 3 is controlled down by the control device, and the switching relay 23 is actuated. This relay moves from its present pull-up position into the release position represented in the drawing, so that the contact 23a is open and the contact 23b closed. The grid impulse device 16, however, remains connected with the control grids of the converter vessel 3 over the contact 21a until its cathode current has dropped to such a low value that the relay 21 is released, so that the contact 21a is interrupted.

But the grid impulse generator 17 for the converter vessel 4 is not connected yet onto the control grid since the contact chain 19a is still interrupted. This changes only when the negative grid bias has returned, after the completion of the deionization of the discharge gaps of the converter vessel 3 on all its control grids. The control grids, whose voltage opposite the cathode is about +20 v. with current flowing, assume thus a negative blocking voltage which corresponds approximately to the voltage of the bias source 12 and 13, respectively.

All relays will thus trip, so that the contact chain 19a is closed. Only now is the grid control device 17 connected with the cathode of the converter vessel 4, so that it can receive current in the desired new direction.

The above mentioned relays 19, 20, 21, 22, 23 must act extremely rapidly. They can consist, for example, in known manner of switch transistors. The relays 19 and 20 can be arranged in a circuit as it is used, for example, in the regulating technique for so-called "And" elements. An arrangement of this kind is illustrated in FIG. 2 wherein it will be seen that resistors 19' are connected in the cathode-grid circuits of converter 3 together with an "And" element 23' leading to a switch transistor 19'a in the output circuit of the impulse voltage generator 17 associated with the grid circuit of the other converter 4. Transistor 19'a becomes conductive only when signalled by the "And" element 23' which acts in accordance with the grid voltage on converter 3. The relays 21 and 22 must be highly current-sensitive. They can be designed as voltage relays which are connected to an auxiliary-rectifier connected with the secondary winding of the respective current transformer.

The invention is not limited to the above described embodiment. Thus, the necessary switching functions can be effected by relays of any type, provided they act with sufficient speed. For example, the relays can consist of so-called cold cathode tubes. The elimination of the grid voltage impulses can also be effected, for example, instead of by interrupting the current, by short-circuiting the impulses over a series resistance.

I claim:

1. In a converter plant, the combination comprising a pair of gas discharge converters each having anode, cathode and control grid elements, means reversely connecting the anode-cathode circuits of said converters between an alternating current supply circuit and a load circuit, a grid control circuit between the cathode and grid elements of each converter, each said grid circuit including a negative grid voltage sufficient to maintain the associated converter in a non-conductive state and a grid impulse voltage generator for over-riding said grid bias and rendering the associated converter conductive, a control device selectively operated for activating said grid impulse voltage generators in alternation so that one or the other of said converters is conditioned for conduction to supply current in the desired direction in said load circuit, and means responsive respectively to the voltage in the grid circuit of each one of said converters for delaying application of the grid voltage impulses produced by the impulse generator associated with the grid circuit of the other converter and thereby delaying conduction of the latter until the grid on said one converter has been return to its negative bias voltage thereby to prevent circulating currents from arising between said converters as operation is switched from one to the other.

2. A converter plant in reversible connection as defined in claim 1 wherein said means responsive to the voltage in the grid circuit of each converter is constituted by a high-speed relay having switching means controlled thereby and which are connected in the output circuit of the grid impulse voltage generator correlated to the grid circuit of the other converter.

3. A converter plant in reversible connection as defined in claim 2 wherein said high-speed relay includes a switch transistor controlled by an "and" element.

4. A converter plant in reversible connection as defined in claim 1 wherein said selectively operated control device is provided with separate voltage output circuits to and controlling each of said grid impulse voltage generators and a third voltage output circuit controlling switching relay means in the output circuits of said grid impulse voltage generators.

5. A converter plant in reversible connection as defined in claim 1 and which further includes a current transformer in the anode-cathode circuit of each converter, and relay means controlled by the secondary of each said transformer and connected in the output circuit of the grid impulse voltage generator correlated thereto.

References Cited by the Examiner
UNITED STATES PATENTS

| | | | |
|---|---|---|---|
| 2,103,786 | 12/1937 | Janetschke | 321—27 |
| 2,512,377 | 6/1950 | Pettibone et al. | 321—40 |
| 2,901,638 | 8/1959 | Huang | 307—88.5 |
| 3,011,093 | 11/1961 | Walker | 321—14 |
| 3,133,240 | 5/1964 | Fischer | 321—38 |

FOREIGN PATENTS

| | | |
|---|---|---|
| 120,585 | 10/1957 | U.S.S.R. |

LLOYD McCOLLUM, *Primary Examiner.*

ROBERT C. SIMS, *Examiner.*